United States Patent [19]
Bruce et al.

[11] Patent Number: 5,468,346
[45] Date of Patent: Nov. 21, 1995

[54] GLASS TREATMENT

[75] Inventors: Robert S. Bruce, West Midlands; Christopher W. G. Hall, Worcestershire, both of United Kingdom

[73] Assignee: Pilkington Aerospace Limited, England

[21] Appl. No.: 217,097

[22] Filed: Mar. 24, 1994

[30] Foreign Application Priority Data

Mar. 27, 1993 [GB] United Kingdom ............. 9306444

[51] Int. Cl.⁶ .................... C03C 15/00; C03C 27/12
[52] U.S. Cl. ................. 216/34; 156/104; 156/326
[58] Field of Search ................. 156/104, 286, 156/325, 326, 663; 65/DIG. 11

[56] References Cited

U.S. PATENT DOCUMENTS

| | | |
|---|---|---|
| 2,439,999 | 4/1948 | Adams . |
| 3,711,263 | 1/1973 | Leger . |
| 3,769,133 | 10/1973 | Halberschmidt et al. ............ 156/104 |
| 3,799,817 | 3/1974 | Van Laethem . |
| 3,806,400 | 4/1974 | Van Laethem . |
| 3,808,077 | 4/1974 | Rieser et al. ................ 156/104 |
| 3,960,627 | 6/1976 | Halberschmidt et al. . |
| 4,174,241 | 11/1979 | Rockar et al. ............... 156/104 |
| 4,180,426 | 12/1979 | Oustin et al. ............... 156/104 |
| 4,242,403 | 12/1980 | Mattimoe et al. ............ 428/213 |
| 4,362,587 | 12/1982 | Baudin et al. .............. 156/104 |
| 4,425,406 | 1/1984 | Palma ...................... 156/286 |
| 4,647,327 | 3/1987 | Rase ....................... 156/104 |
| 4,799,346 | 1/1989 | Bolton et al. . |
| 4,894,282 | 1/1990 | Le Grand et al. ........... 156/104 |
| 4,911,743 | 3/1990 | Bagby . |

FOREIGN PATENT DOCUMENTS

| | | |
|---|---|---|
| 280800 | 4/1965 | Australia ................. 156/663 |
| 1330886 | 1/1985 | European Pat. Off. . |
| 830103 | 3/1960 | United Kingdom . |
| 965790 | 8/1964 | United Kingdom . |
| 1159160 | 7/1969 | United Kingdom . |
| 1230678 | 5/1971 | United Kingdom . |
| 1359165 | 7/1974 | United Kingdom . |
| 1368785 | 10/1974 | United Kingdom . |
| 1556051 | 11/1979 | United Kingdom . |
| 2221424 | 2/1990 | United Kingdom . |

OTHER PUBLICATIONS

Kansai Paint KK: JP 52044834, Apr. 8, 1977–Abstract.
Boguslacskii IA Krasovska: SU 333144–Abstract (Date Unknown).
Soviet Journal of Optical Technology, vol. 41, No. 9, Sep. 1974, pp. 431–432: "Strengthening quartz optical components by a chemical treatment" by L. A. Orlova and A. Ya. Kuznetsov.

*Primary Examiner*—George Fourson
*Assistant Examiner*—Thomas G. Bilodeau
*Attorney, Agent, or Firm*—Howrey & Simon

[57] ABSTRACT

A glass ply having a chemically strengthened surface, for example a chemically etched surface, for use in a laminated glazing is treated by hot melting a thermoplastic material onto such strengthened glass surface prior to incorporation of the glass ply into the required laminate. The thermoplastic material may be polyvinylbutyral but is preferably polyurethane.

19 Claims, 1 Drawing Sheet

GLASS TREATMENT

BACKGROUND OF THE INVENTION

1. Field of the Invention

The invention relates to a method of treating strengthened glass to maintain the strength of the glass, to strengthened glass components so treated, to laminated glazings comprising such components, and to a method of bonding a layer of polyurethane to glass.

2. Description of the Prior Art

It has previously been proposed to enhance the strength of glass by etching the glass surface to remove or reduce flaws therein which might serve as a site for the initiation of cracks in the glass. This has been done by acid etching or polishing which removes glass stock by dissolving away the glass, so either removing the flaws or at least smoothing the bottoms of the flaws thereby reducing the stress concentrating effect caused by the flaws in glass subjected to bending forces.

Thus it has previously been proposed, for example in Swiss patent specification 367 942 dated 1958 and U.S. Pat. No. 3,711,263 dated 1969, to enhance the strength of glass by etching the surface up to a depth of 80 or 20 microns respectively to remove surface defects and thereby strengthen the glass; the patent specifications suggest applying silica or an inorganic layer over the etched surface as a protective or hard layer. According to the Swiss patent specification, optimal strengthening may be achieved by thermal treatment of the glass directly after etching and before provision of a protective layer. According to the U.S. patent the glass treated is chemically toughened before etching.

GB patent specification 1 359 165 dated 1974 relates to laminated glass for use in buildings and vehicles; it teaches subjecting a face of a glass pane to a rectifying treatment which reduces the impairment of that face by faults liable to cause stress concentrations when tensioning forces are applied to the glass pane, and using that pane in a laminate with the face which has been subject to the rectifying treatment located internally of the laminated. The rectifying treatments described include fire polishing and chemical dissolution (etching). Because the etched face is protected within the laminate (the invention is indicated to be especially suitable for production of laminated automotive windscreens), it is used in contact with an interlayer material used in the laminate, typically polyvinylbutyral.

The fact that the strength of glass may be enhanced by etching or other surface treatment to remove or modify surface faults, and that the etched surface may subsequently be protected by coating or used in contact with a thermoplastic layer within a laminate has thus been documented for many years. Despite this, and the fact that there has been a continuing need for glass components with a higher strength to weight ratio—especially for use in the construction of aircraft windshields—the only commercial use of surface etching to increase the strength of glass components of which the applicants are aware has been to increase the strength of very thin glass (typically 0.05 to 0.5 mm thick) used for solar cell cover glasses. It is believed that this is because of the difficulty in maintaining the improvement in strength during subsequent processing to assemble the glass into a window.

SUMMARY OF THE INVENTION

According to the present invention, there is provided a method of treating a glass ply having a chemically strengthened surface for use in a laminated glazing which comprises hot melting a thermoplastic material onto such chemically strengthened glass surface prior to incorporation of the glass ply into the required laminate.

In a preferred aspect of the invention, the method involves encapsulating the glass ply with each of its major faces protected by an adjacent layer of thermoplastic material prior to the assembly of the glass ply with a further ply or plies to form the required laminate.

The expression "chemically strengthened surface" is used to encompass surfaces that have been strengthened by ion exchange, as well as surfaces that have been strengthened by chemical etching, for example with hydrofluoric acid.

BRIEF DESCRIPTION OF THE DRAWINGS

The drawing is a diagrammatic cross sectional view illustrating the technique used for encapsulating a chemically strengthened glass ply in a thermoplastic sheet material as more fully described hereinafter.

DETAILED DESCRIPTION OF PREFERRED EMBODIMENTS OF THE INVENTION

Figure 1:
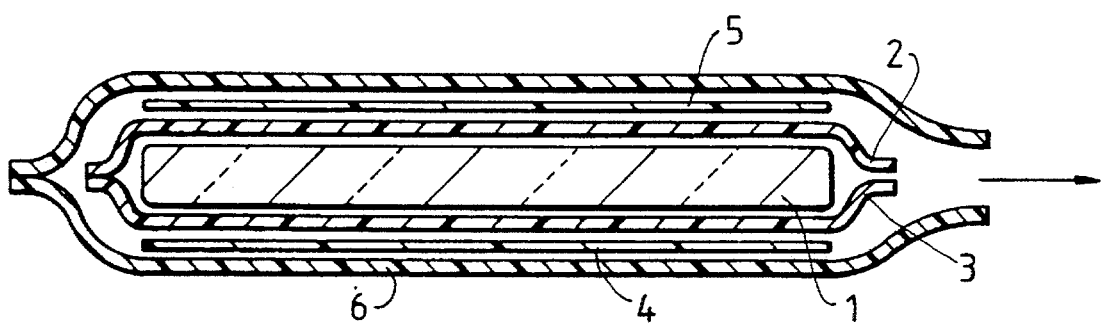

The thermoplastic material may be applied as a preformed layer and may be polyvinylbutyral but is preferably a polyurethane, especially a polyurethane based on an aliphatic polyether or polyester. The thermoplastic layer should have a thickness of at least 0.005" (0.125 mm) to provide satisfactory protection to the strengthed glass surface and preferably has a thickness of at least 0.010" (0.25 mm). There is generally little benefit in using thermoplastic layers thicker than 1 mm although such thicker layers may be used if desired. The expression "encapsulating" is used to indicate that the plastics interlayer covers most or, preferably, substantially all of the two opposed major faces of the glass for the best protection, it may also cover the edge faces of the glass.

The glass ply in contact with the thermoplastics layer may be heated above the softening point of the thermoplastic, conveniently at least 5° C. and preferably at least 10° C. above said softening point, to bond the thermoplastic material to the glass. The heating is conveniently carried out with the glass ply in contact with the thermoplastic layers under pressure, for example, in an evacuated bag, although other heating arrangements may be used if desired.

While polyvinylbutyral generally has a great affinity for glass, and there is no need to use an adhesion promoter to obtain optimum adhesion between the plastics and the glass, the same is not generally true of polyurethane, and an adhesion promoter is customarily applied to any glass surface which is to be securely bonded to polyurethane. While, in the practice of the present invention, it is possible to prime the glass surface after it has been subject to a strengthening process, it is generally desirable, especially when that strengthening process is an etching process, to avoid any further handling of the glass prior to protection which could lead to damage of the unprotected surface. It has been found that it is in fact unnecessary to apply an adhesion promoter to the glass, but it may be applied to the polyurethane layer (if desired to the exposed face of the polyurethane layer after the latter has been applied to the glass) and, if the polyurethane layer is heated to a sufficiently high temperature, will migrate through the polyurethane layer to enhance its adhesion to the glass. To promote such migration, the glass and polyurethane layers are preferably heated at a temperature at least 35° C., and preferably about 40° C. or more, above the softening point of the polyurethane.

The method of the present invention is especially applicable to glass plies which have been strengthened by etching. When etching thermally strengthened glass, we prefer to etch away over 80 microns, generally over 90 microns and especially over 100 microns from each of the glass surfaces to be etched. Etching of the strengthened glass surface removes the highly stressed outer layer and it might have been expected that removal of such a thick layer would lead to a reduction, rather than an increase, in the glass strength and, in practice, we have found it desirable to avoid removing more than about 150 microns thickness from thermally toughened glass surfaces. The compressively stressed surface layers in thermally strengthened glass (unlike those of chemically strengthened glass) tend to be a constant percentage, typically 15–20%, of the total thickness of the glass, substantially irrespective of glass thickness in the normal range of thermally toughened glass thicknesses. Thus it will be appreciated that such etching techniques are most applicable for strengthening thermally toughened glass by etching when the glass treated has a nominal thickness of at least 4 mm and preferably at least 5 mm, so that too high a proportion of the compressively stressed layer is not removed.

There is generally a higher concentration of deeper flaws at the cut edges of the glass and, even after the grinding and polishing of the edge faces normally carried out prior to thermal tempering, such flaws may be several hundred microns deeper. It is therefore preferred to preferentially etch the edges to a greater depth, for example a depth greater than 500 microns, than the major faces of the glass. This may conveniently be done in practice by carrying out an initial etching step with the major faces of the glass protected from attack, for example by an acid resistant protective film such as paraffin wax, or a preformed plastics film for example an adhesive polyethylene or polyvinylchloride film, and subsequently removing that protection and subjecting the whole surface of the glass to a further etching step.

The etching may be carried out using aqueous hydrofluoric acid preferably having a concentration in the range from about 3% by weight HF to about 10% by weight HF, preferably a concentration in the range from about 5% by weight HF to about 6% by weight HF, since the more concentrated acid has a tendency to etch the glass unevenly resulting in a roughened surface, while the use of weaker acids extends the etch time necessary to remove the desired amount of glass. If desired, the etchant solution may be buffered, for example, a 5% by weight solution of aqueous HF may be buffered with 5% by weight of ammonium fluoride, $NH_4F$.

The temperature of the acid is not critical but it is preferred to operate at a temperature in the range 10° C. to 30° C. in order to achieve an acceptably flat surface at an acceptable etch rate, and it is generally convenient to operate at ambient temperature i.e. about 20° C. The acid should be agitated relative to the glass surface and, using the preferred 5 to 6% by weight aqueous HF at a temperature of 20° C., an etch rate of approximately 50 microns per hour may be achieved.

The glass ply etched is preferably tempered to a modulus of rupture of at least 180 MPa and preferably at least 200 MPa prior to etching, and if it is to be used in a curved glazing product, should be curved to shape prior to etching. In practice, the glass will first be curved to shape and then, while still hot from the curving process, rapidly quenched in, for example powder or air.

However, while the method of the invention is especially applicable to the protection of glass plies which have been strengthened by etching, it is also useful for treatment of glass plies which have been strengthened in other ways which result in their being vulnerable to surface damage, for example, the well known chemical strengthening (tempering) process in which the glass surface is strengthened by ion exchange. In this process, the glass, which may be of special composition, is contacted with a layer of molten salt which contains cations, commonly potassium or sodium ions, which exchange with smaller cations, commonly sodium or lithium ions, in the glass surface giving rise to a compression layer at the glass surface which enhances the strength of the glass. However, in such chemically strengthened glass, the compression layers tend to be quite thin, typically being 40 to 300 microns in thickness, so that surface damage after such chemical strengthening may lead to significant reductions in strength.

When, as is usual, the glass ply is required fop use as a component of a curved laminated product, it should of course be curved prior to the strengthening process and the treatment of the present invention to avoid risk of damaging the strengthened surface during curving. Thus the method of the invention will normally be applied to glass plies which are already curved e.g. for use as components of aircraft windshields.

The invention is illustrated but not limited by the following Examples.

EXAMPLE 1

A batch of 5 mm thick clear float glass samples, each 300 mm×38 mm, were thermally tempered (toughened) by a powder quenching process of the type described in UK patent specification 1 556 051. 50% of the samples were tested immediately after toughening and found to have, on average, a bending strength (modulus of rupture) of 260 MPa.

The remaining 50% of the batch of glass samples were etched by immersion, with agitation, in a 5% by weight solution of aqueous hydrofluoric acid at 18° C. for 100 minutes, which resulted in the removal of a surface layer of glass 125 microns deep. The samples were washed in tap water, and then in deionised water and allowed to dry in air (if desired, the drying could be assisted by adding isopropyl alcohol to the deionised water used, for the second wash, and/or by force drying with warm air). The samples were then encapsulated in a layer of thermoplastic material as illustrated, diagrammatically, in the accompanying drawing. To avoid, as far as possible, any damage of the etched glass surface after etching and prior to encapsulation, any necessary handling of the etched glass was carried out very carefully with rubber gloves.

Referring to the drawing, a thermally toughened and subsequently etched glass sample 1 was laid between two preformed layers 2,3 of a thermoplastic polyurethane PE 192 each 0.015" (0.375 mm) thick (PE192 in a thermoplastic aliphatic polyurethane, based on polyether, available in commerce from Morton Thiokol of USA). Although, as illustrated in the drawing, separate sheets of polyurethane were used to provide the layers in contact with the opposed major faces of the glass, it will be appreciated that a single folded sheet could be used to provide layers in contact with both major faces, and indeed the edge faces, of the glass. Thin embossed inert polythene films 4,5 were then placed over the polyurethane layers to facilitate air extraction and keep the surface of the polyurethane clean. The assembly of glass ply, polyurethane layers and inert films was placed in a plastics (polypropylene/polyester composite) vacuum bag 6 which was subjected to air extraction for a period of 30 minutes to evacuate the bag and press the polyurethane against the glass ply under atmospheric pressure. After completing the air extraction, the plastics bag was sealed and the whole assembly heated in an oven for 3 hours at a temperature of 110° C. i.e. 15° C. above the softening point of the polyurethane. The polyurethane partially wet out onto the glass encapsulating the major faces and all edges and thereby protecting them from surface damage.

The sample was allowed to cool, removed from the bag and strength tested. The remaining etched samples were similarly encapsulated and strength tested. The etched and encapsulated samples were found to have, on average, a strength i.e. modulus of rupture of 660 MPa.

EXAMPLE 2

A batch of 6 mm thick clear float glass samples, each 200 mm by 38 mm were thermally toughened, etched and encapsulated as described in Example 1 except that 50% of the samples were encapsulated in polyurethane PE192 and 50% of the samples were encapsulated in polyurethane PE193 (an aliphatic, polyether based polyurethane similar to PE192, but having a lower softening point of 80° C.).

The encapsulated samples (after removal from the plastics bags) were assembled into peel test coupons for measuring the adhesion of the glass to the polyurethane.

Each encapsulated sample was sprayed with a 5% solution of A1100 adhesion promoter (an amino silane adhesion promoter available in commerce from Union Carbide of USA) in ethanol and allowed to dry in air for 30 minutes. The assembled test coupons were then heated in an autoclave for 2 hours at a constant pressure of 6 bar at 115° C., 125° C. or 135° C., allowed to cool, removed from the autoclave and peel tested. The following results were obtained:

| Polyurethane encapsulated | Autoclave temperature °C. | Mean peel load pounds per inch |
| --- | --- | --- |
| PE192 | 125 | 8 |
| PE192 | 135 | 280 |
| PE193 | 115 | 6 |
| PE193 | 125 | 280 |

This Example illustrates the surprising effectiveness of the adhesion promotor in improving the adhesion of the polyurethane to the glass, providing the autoclaving temperature is sufficiently high (generally about 40° C. or more above the softening point of the polyurethane) for the adhesion promoter to migrate through the polyurethane to the glass surface during autoclaving.

This surprising result may be applied not only in the encapsulation of strengthened glass in accordance with the present invention, but in other circumstances where it is desired to bond a layer of thermoplastic polyurethane to glass. Thus, according to a further aspect of the present invention there is provided a method of bonding a layer of thermoplastic polyurethane to glass which comprises applying an adhesion promoter to the polyurethane, and heating the polyurethane whereby the adhesion promoter migrates through the polyurethane to the glass surface thereby enhancing the adhesion of the polyurethane to the glass.

The treatment of the present invention enables proper advantage to be taken of the increase in strength resulting from chemical strengthening or etching of glass plies to be incorporated into a laminated glazing, permitting the use of thinner load bearing glass plies and consequent lighter weight glazings. This is especially important for production of aircraft glazing providing a required impact performance at a low design weight.

We claim:

1. A method of treating a glass ply having a chemically strengthened surface to produce a treated strengthened glass component for subsequent assembly into a laminated glazing which method comprises encapsulating the glass ply with each of its major faces and its edge faces protected by an adjacent layer of thermoplastic material with hot melting of the thermoplastic material onto such strengthened glass surface prior to incorporation of the glass ply into the required laminated glazing.

2. A method as claimed in claim 1 wherein the thermoplastic material is polyurethane.

3. A method as claimed in claim 1 wherein the thermoplastic material has a thickness of 0.010 inches or more.

4. A method as claimed in claim 1 which comprises heating the glass ply in contact with at least one adjacent thermoplastic layer in an evacuated bag.

5. A method as claimed in claim 2 wherein an adhesion promoter is applied to the polyurethane and the polyurethane heated whereby the adhesion promoter migrates through the polyurethane to the glass surface enhancing the adhesion of the polyurethane to the glass.

6. A method as claimed in claim 5 wherein, after the polyurethane has been applied to the glass, the polyurethane has a face adjacent the glass and an exposed face and the adhesion promoter is applied to the exposed face of the polyurethane.

7. A method as claimed in claim 1 wherein the glass ply is a glass ply which has been chemically strengthened by ion exchange.

8. A method as claimed in claim 1 wherein the glass ply has been chemically strengthened by etching of at least one of its major surfaces.

9. A method as claimed in claim 8 wherein the glass ply has been strengthened by etching over substantially the whole of its surface area.

10. A method as claimed in claim 8 wherein the glass ply which has been chemically strengthened by etching is a thermally tempered glass ply.

11. A method as claimed in claim 1 wherein the glass ply is an etched thermally tempered glass ply having a thickness of greater than 4 mm.

12. A method as claimed in claim 1 wherein the glass ply is curved.

13. A method as claimed in claim 1 wherein the glass ply is for use as a component of an aircraft glazing.

14. A method of treating a glass ply to produce a treated strengthened glass component for subsequent assembly into a laminate which method comprises chemically etching the surface of the glass and encapsulating the glass ply with each of its major faces and its edge faces protected by an adjacent layer of thermoplastic material with hot melting of the thermoplastic material onto such etched glass surface prior to incorporation of the glass ply into a laminate.

15. A method according to claim 14 wherein substantially the whole surface of the glass is etched and thereafter protected with a thermoplastic layer prior to incorporation of the glass ply into a laminate.

16. A method of bonding a layer of thermoplastic polyurethane to glass which comprises applying the polyurethane layer to the glass whereby the polyurethane layer has a face adjacent the glass and an exposed face, applying an adhesion promoter to the exposed face of the polyurethane and heating the polyurethane whereby the adhesion promoter migrates through the polyurethane to the glass surface thereby enhancing the adhesion of the polyurethane.

17. A method as claimed in claim 16 wherein the adhesion promoter is an aminosilane.

18. A method as claimed in claim 16 wherein a solution of the adhesion promoter in an organic solvent is sprayed onto the polyurethane.

19. A method as claimed in claim 16 wherein the glass is strengthened glass and the polyurethane is bonded to a strengthened face of the glass.

* * * * *